United States Patent [19]

Girard

[11] 3,942,960

[45] Mar. 9, 1976

[54] APPARATUS AND METHODS FOR CONTACTING GASES OR VAPOURS WITH PARTICULATE SOLID MATERIAL

[75] Inventor: Maurice Victor Girard, London, England

[73] Assignees: The British Ceca Company Limited, London; Croftshaw (Engineers) Limited, Suffolk, both of England; part interest to each

[22] Filed: Apr. 22, 1974

[21] Appl. No.: 463,030

[52] U.S. Cl. .................................. 55/74; 55/387
[51] Int. Cl.² .................................... B01D 53/02
[58] Field of Search ........... 55/30, 34, 35, 387, 388, 55/389, 68, 59, 74, 75, 29, 208

[56] References Cited
UNITED STATES PATENTS
2,237,684  4/1941  Moore ................................. 55/74

*Primary Examiner*—John Adee
*Assistant Examiner*—Ethel R. Cross
*Attorney, Agent, or Firm*—Ladas, Parry, Von Gehr, Goldsmith & Deschamps

[57] ABSTRACT

An improved vessel design is provided for contact of gas or vapour with particulate solid material, for example for adsorption systems such as air drying and solvent recovery systems, in which a plurality of trays for containing the particulate material are supported by a pillar structure within the shell of the vessel, the shell serving merely as an envelope which does not provide support for the trays thereby enabling a considerable reduction in material costs for the shell and greater design flexibility for the site where the vessel is to be installed. The pillar preferably forms a manifold for conveying gas or vapour streams to or from each of the trays and deflecting baffles for the gas or vapour streams are also provided. A sparge pipe may also extend along the duct to introduce steam or other purge gas for regeneration of an adsorbent in situ.

16 Claims, 7 Drawing Figures

APPARATUS AND METHODS FOR CONTACTING GASES OR VAPOURS WITH PARTICULATE SOLID MATERIAL

FIELD OF THE INVENTION

This invention relates to apparatus and methods for contacting gases and vapours with particulate solid material such as in absorption or adsorption and desorption of gases and vapours, e.g., dessication, solvent recovery, catalysis, odour removal and general pollution control.

DESCRIPTION OF THE PRIOR ART

Industry has for many years required the use of dehumidified or dry air and a variety of adsorption plants have hitherto been designed for this purpose for use with dessicants such as silica gel. Also, many industries use organic volatile solvents in various processes and in the past it has been customary practice to discharge unused solvent vapours to atmosphere as waste in an air stream. The rising cost of such solvents, however, has made it economically worthwhile for some time for industries to install adsorption plants recover unused solvent vapours. There is also the increasing environmental consideration of preventing odours in the atmosphere and generally controlling air pollution.

Such adsorption plants include adsorber vessels which are designed to hold particulate solid adsorbents in vertical or horizontal beds or in some cases fluidised beds through which air or gas streams are passed for extraction of specific substances therefrom, e.g. moisture or solvent vapours, with subsequent passage of such air or gas streams to process or to atmosphere freed or largely freed from the adsorbed substances. The beds of adsorbent may in general be regenerated in situ using heated air or gas in the case of dessicants such as silica gel or molecular sieves, or steam in the case of adsorbed organic solvent vapours on activated carbon which steam can then be condensed for recovery of liquid solvent.

Conventional adsorber vessels hitherto used have usually been of the horizontal bed type in which either a single bed or two beds of adsorbent are supported by the outer shell of the vessel to divide the interior of the vessel into different zones for entry and exit of the air or gas streams. The size of such adsorber vessels is of course dictated by the area of the adsorbent bed or beds required as determined by the amount of air or gas to be processed and the quantity of adsorbent required to maintain a given contact time. Such adsorber vessels are usually built away from the site where they are eventually to be located and so the design of the vessels is such that they can be transported, for example by rail. Hence, in situations where large adsorber installations are required, the vessels have to be made longer and longer because the width of the vessels is limited by the fact that the vessels are to be transported to the site. However, the longer the vessel the greater is the problem of uneven distribution of the passage of the air or gas streams through the bed or beds of adsorbent and there is also the possibility that such vessel design may be unsuitable to the particular sites where the vessels are to be installed. Therefore, for large installations it is usually necessary to build such vessels on site which is more complicated and hence more costly.

Another disadvantage associated with the use of the conventional horizontal bed adsorber vessel is that since the adsorbent bed or beds are supported by the outer shell of the vessel, the cost of the materials needed to construct the shell of the vessel increases considerably with size so that the shell has the necessary strength. This disadvantage is accentuated in solvent recovery systems where it is desirable to construct the shell of an adsorber vessel from expensive corrosion resistant materials such as stainless steel and other nickel alloys. For example, most of the ketones give rise to traces of acetic acid when they are desorbed by passing steam through the adsorbent and initially when the steam comes into contact with the interior surface of the shell of the adsorber vessel it condenses thereon to some extent until the whole structure heats up. Thus, unless the shell is constructed of a corrosion resistant material, the shell will suffer corrosion from the agressive liquid condensate during the initial stage of the steaming process. The tray supporting structure, however, is less likely to be corroded to the same extent because this heats up very quickly when steaming is commenced and is therefore maintained relatively dry. It follows that any improvement in the design of such plant which affords greater contact between the gas or vapour stream and the adsorbent for less hardware is a major improvement.

OBJECTS OF THE INVENTION

It is therefore an object of the invention to provide an improved design of vessel for use in absorption or adsorption systems which obviates the above-mentioned disadvantages of material costs associated with the shell of the vessel.

Another object of the invention is to provide a vessel design which overcomes uneven distribution problems of gas or vapour within the vessel while affording greater flexibility of design for the site where the vessel is to be located.

A further object of the invention is to provide methods of absorption and adsorption which utilize such improved vessel designs.

Yet another object of the invention is to provide an air drying system incorporating a plurality of adsorber vessels of improved design which enables large installations to be constructed more simply on site at reduced cost and which affords greater design flexibility with less distribution problems according to the site where the vessels are to be erected.

A still further object is the provision of a solvent recovery system which includes a plurality of adsorber vessels of improved design which enables the vessel shells to be fabricated at reduced cost from expensive non-corrosive alloys if necessary and with greater flexibility of design according to the site.

SUMMARY OF THE INVENTION

The above objects are achieved in accordance with the invention by providing a vessel in which a plurality of trays adapted to hold particulate solid material for passage of gas or vapour therethrough are supported by means of a pillar. The pillar comprises an interior duct which communicates with at least one port in the shell of the vessel and is arranged to convey the gas or vapour streams to or from the trays. The shell has one or more other ports which communicate with the shell interior surrounding the trays. Each of the trays has openings for allowing passage of gas or vapour through the beds of particulate solid material to be supported by the trays and these openings are in communication with respective groups of apertures in the supporting pillar. The arrangement is such that passage of gas or vapour through the apparatus is permitted only via the openings in the trays and the apertures in the supporting pillar. According to a preferred embodiment of the invention the pillar also provides support for the shell by extending for the whole height of the vessel.

The vessel according to the invention is preferably adapted for use with solid adsorbents such as silica gel or pelleted activated carbon for air drying and solvent recovery respectively. Examples of materials which are suitable for forming the bottom surfaces of the trays to support the adsorbent and allow passage of gas or vapour therethrough are woven wire mesh, perforated metal sheet and expanded metal sheet, preferably with openings of about 10 U S mesh. In the preferred arrangement there are at least three trays, preferably four to six trays, and the tray-support pillar actually forms a manifold for conveying the gas or vapour streams to or from the trays. The trays are supported from the pillar by means, such as, for example coneshaped baffles, which act to direct the flow of gas or vapour between the trays and the interior of the pillar. Normally, such tray support by the pillar will be sufficient but for large trays it may be desirable or necessary to provide additional support for the trays by including a number of support members, e.g. rods, extending upwards from the base of the vessel around the periphery of the trays and attached thereto.

It is a feature of the invention that the shell serves merely as an envelope which provides substantially no support for the tray structure. This means that the shell may be fabricated from relatively light gauge material. It may be desirable or necessary, however, for example in large installations to strengthen the shell by the addition of stiffening members.

In another preferred form of the invention means may extend within the interior duct of the pillar to enable the introduction of purge gas for regeneration of an adsorbent in situ in the trays. This feature is particularly useful in solvent recovery systems incorporating adsorber vessels constructed according to the invention. It is customary to use beds of pelleted activated carbon for adsorption of solvent vapours and for regeneration of the adsorbent bed steam is conventionally used. For this purpose, a steam sparge pipe preferably extends along the interior duct of the tray-support pillar to provide a convenient means for the introduction of steam under pressure.

It will be apparent therefore that since the shell of a vessel designed according to the invention may be formed of relatively light gauge material this affords a considerable saving in material costs especially when it is necessary to construct the shell from expensive alloys to withstand corrosive conditions. Also such vessel design enables relatively simple assembly and erection on site from segments which are easily prefabricated and transported. A further advantage is that the vessel design according the the invention enables wide dimensional variations to be made to suit various site conditions. That is to say, the number of beds can be varied and they may be made narrower or wider and of various perimetric shapes as dictated by the site.

BRIEF DESCRIPTION OF THE DRAWINGS

Further features and advantages of the invention will be understood from the following detailed description taken in conjunction with the accompanying drawings which illustrate preferred embodiments and in which.

As illustrated in FIGS. 1 to 4, the air drying system comprises two adsorber vessels 10 and 10' designed and constructed according to the invention. Each adsorber contains a plurality of superposed horizontal trays 12, 12' preferably of circular shape arranged to support multiple beds of dessicant, for example silica gel.

Figure 1:
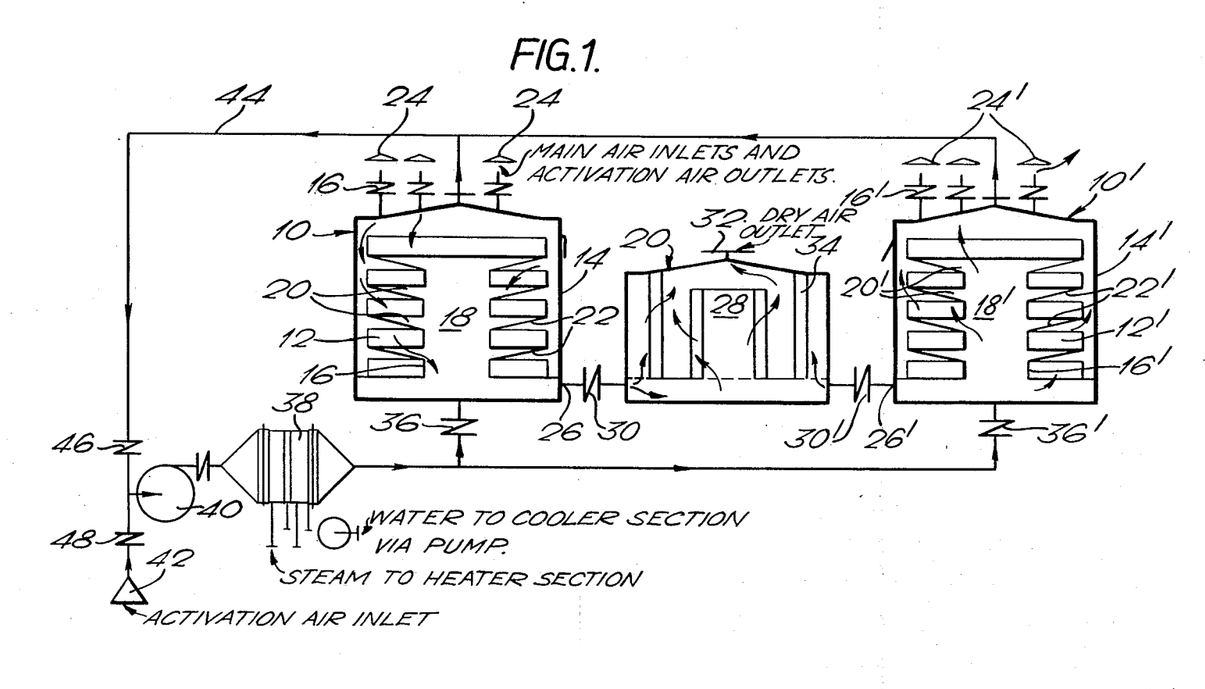
FIG. 1 is a schematic flow diagram of an air drying system incorporating adsorber vessels constructed in accordance with the present invention.
Figure 2:
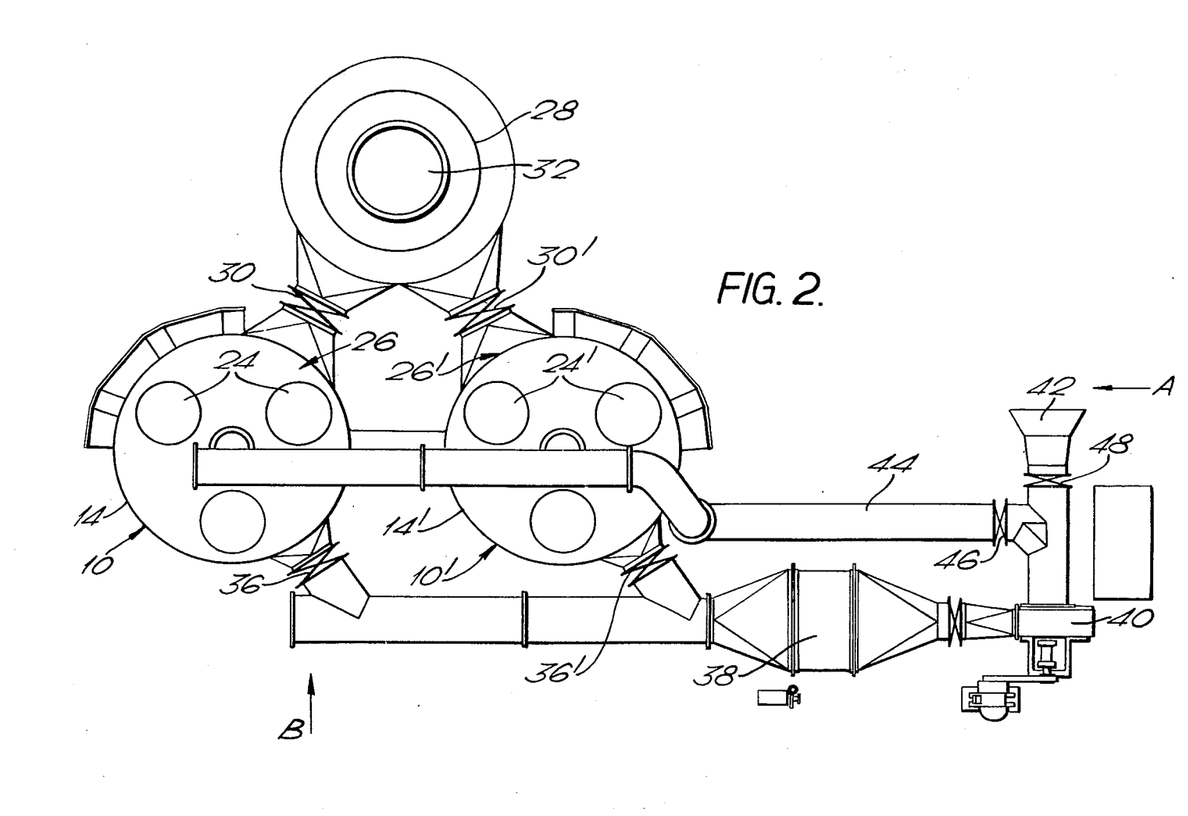
FIG. 2 is a plan view showing the layout of plant constructed according to the flow diagram shown in FIG. 1.
Figure 3:
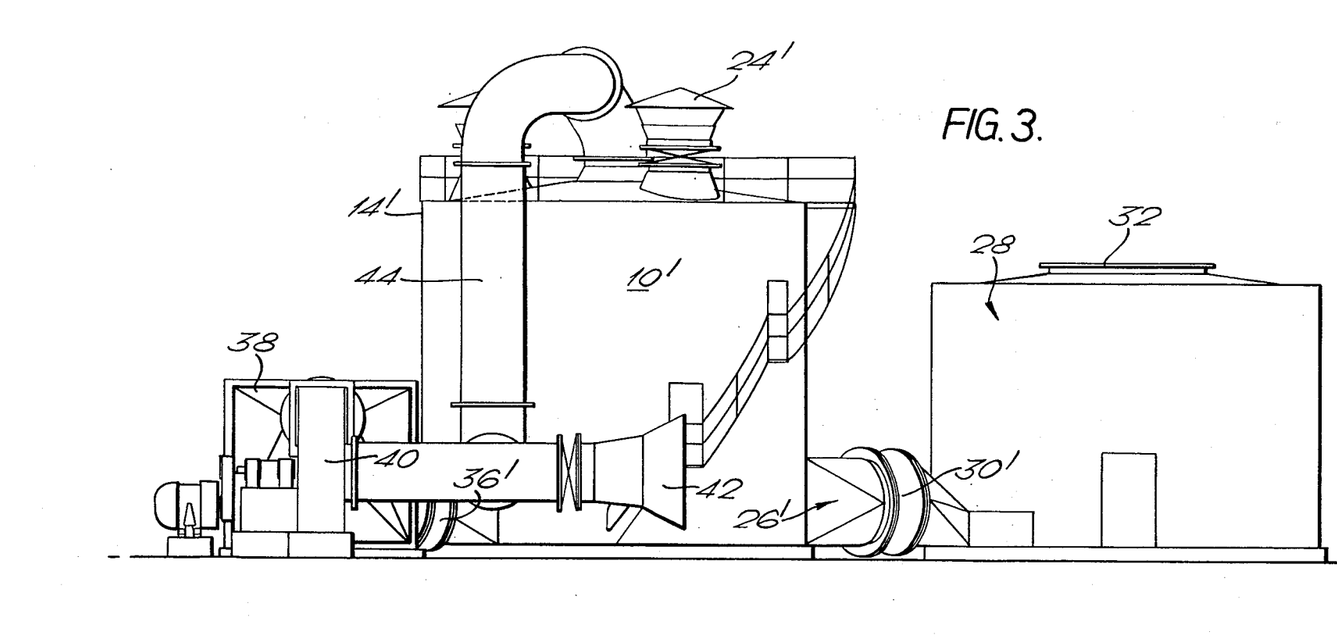
FIG. 3 is a side elevation of the air drying plant taken in the direction of the arrow A in FIG. 2.
Figure 4:
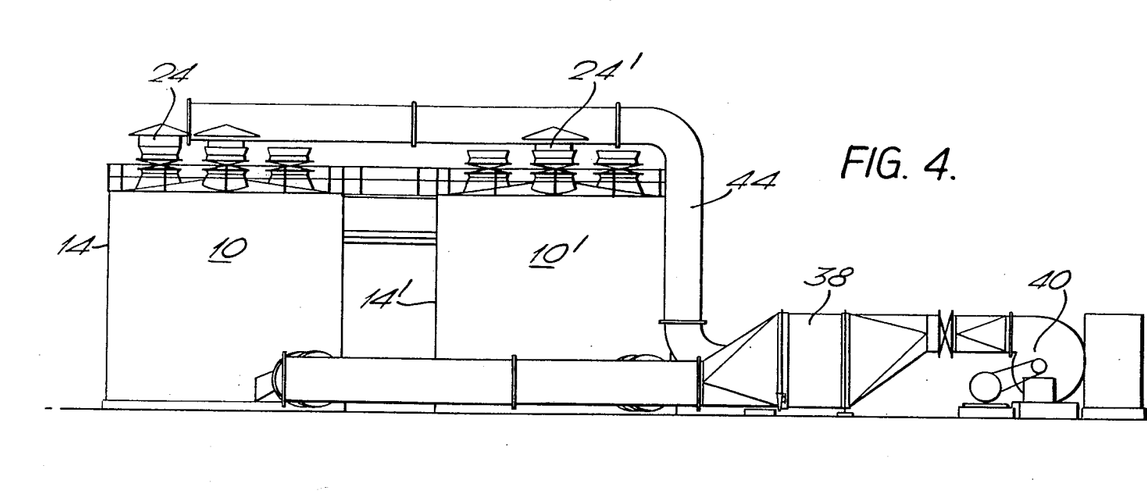
FIG. 4 is a front elevation of the air drying plant taken in the direction of the arrow B in FIG. 2.

The trays 12, 12' are supported within an outer shell 14, 14' of each vessel by means of a central pillar 16, 16' which also provides an interior duct 18, 18' for the air with apertures e.g. 16a, 16a' arranged to allow passage of air of the required volume of air between the interior duct and each interspace 20, 20' associated with the adsorbent beds. The interspaces 20, 20' are formed by respective cone-shaped baffles 22, 22' which extend between adjacent trays as shown in FIG. 1. Each of the baffles 22, 22' have a lower side which is effective to direct air entering the interior of the shell onto the bed immediately underneath it and an upper side which is effective to direct air into the interior duct 18, 18' of the central pillar after the air has passed through the adsorbent bed immediately above the baffle. In accordance with the invention the outer shell 14, 14' acts merely as an envelope and does not serve to support the trays 12, 12'. Such support is provided solely by means of the central pillar 16, 16'.

During an air drying operation, air is drawn from the atmosphere via ports 24, 24' on the top of the adsorbers into the interior of the shell 14, 14' and is then deflected through the dessicant beds by the baffles 22, 22' as indicated generally by the arrows in the adsorber 10. After passing through openings (not shown) in the trays 12, 12' and into the interspaces 20, 20', the baffles 22, 22' direct the air through the apertures in the central pillar 16, 16' and into the interior duct 18, 18'. The interior duct 18, 18' conveys the dry air to another port 26, 26' at the base of the adsorber vessel. After leaving the adsorbers the dry air is then drawn into a filter house 28 via valves 30, 30'. In the filter house 28 the dry air is filtered to prevent small foreign bodies from entering subsequent compressor equipment (not shown) which provides the power source necessary to draw the air through the adsorbers 10, 10' and the filter house 28. Such compressor equipment draws the air from the filter house via an outlet port 32 and supplies the dry air for any desired use or application.

The filter house 28 contains batteries of replaceable filter elements formed, for example, of paper and arranged vertically in racks which are designed for easy withdrawal. In FIG. 1 the filter elements are identified by the reference numeral 34 and the direction of air flow through the filters is indicated generally by the arrows.

The dessicant beds steadily increase in concentration as moisture is adsorbed from the incoming air until it becomes necessary to stop the adsorption process by closing the valves 30, 30'. However, to maintain a continuous supply of dry air, the adsorber vessels are staggered cyclically so that when one is fully saturated the other is only half saturated. In FIG. 1, the arrows showing the direction of air flow through the adsorbers 10, 10' indicate that the vessel 10 is in an adsorption phase and that the vessel 10' is in an desorption phase. During desorption, the dessicant beds are regenerated by passing heated air through the beds in opposite direction and, as shown in FIGS. 1 to 4, the heated air is supplied via valves 36, 36' from a heat exchanger 38 which is fed by a centrifugal pump 40 drawing air from the atmosphere via an activation air inlet 42. With the adsorber 10' in a desorption phase, the valve 30' is closed and the valve 36' is open. The heated activation air passes through the saturated beds for regeneration of the dessicant and the moisture laden air is allowed to escape to atmosphere through the ports 16'. Some of the heated activation air may be recirculated via a valve controlled conduit 44, the balance between recirculated air and fresh activation air being maintained by valves 46 and 48 and the quantitity of moisture laden air escaping through the ports 16'. When desorption of the adsorber 10' is complete, the various valves are switched and the vessel 10' goes back onto an adsorption phase while the vessel 10 changes to a desorption phase. It will be appreciated that while an air drying system having only two adsorber vessels has been shown and described, the number of vessels may be increased depending upon the quantity of dry or dehumidified air required and the desired degree of continuous supply.

Figure 5:
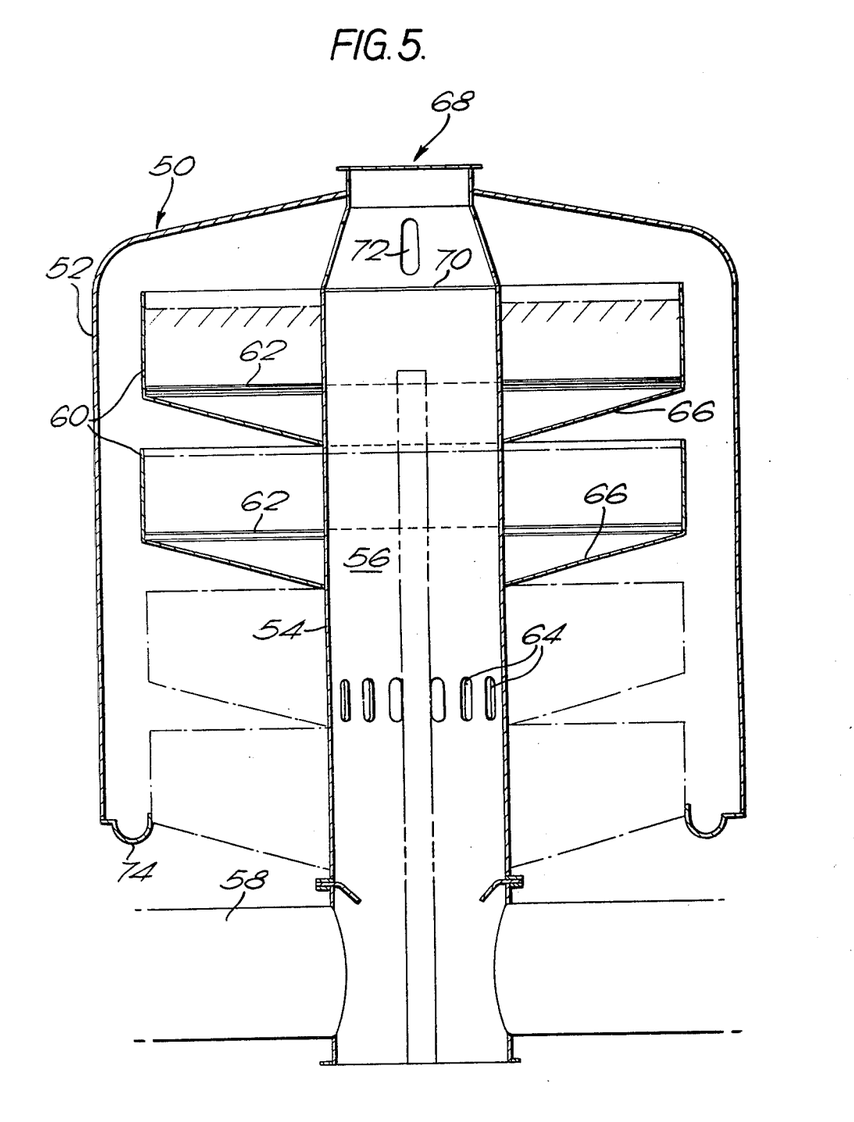
FIG. 5 is a diagrammatic vertical section of a preferred form of adsorber vessel designed specifically for use in a solvent recovery system.
Figure 6:
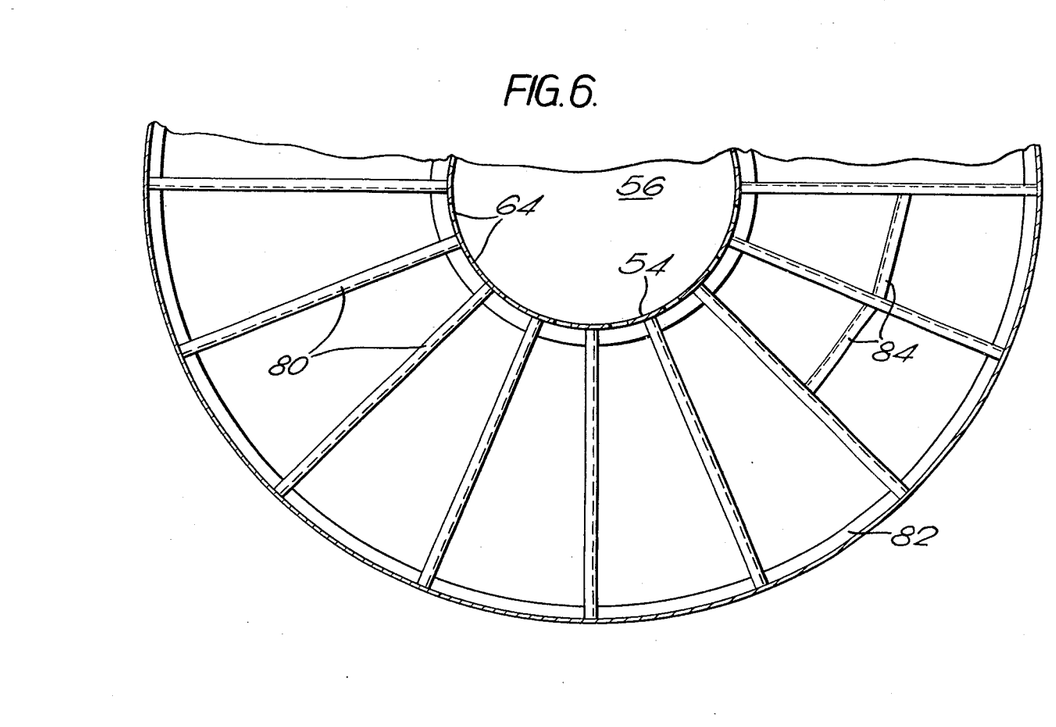
FIG. 6 is a diagrammatic partial plan view showing some detail of tray support structure in the adsorber vessel illustrated in FIG. 6.

Referring now to FIGS. 5 and 6, an adsorber vessel 50 is shown which has been specifically designed for use in solvent recovery systems. The adsorber has an outer shell 52 constructed of relatively light gauge material as it is supported by a central pillar 54. The pillar 54 forms an internal duct 56 which is in communication with an exhaust conduit 58. The vessel contains four trays 60 for containing particulate adsorbent material, e.g. pelleted activated carbon, and these trays are supported solely by the central pillar 54.

The trays 60 are supported by support member 80 (see FIG. 6) spaced circumferentially around the central pillar 54 which forms the inner periphery of the circular trays and a support strip 82 is placed around the extremities of the support members 80 to support the outer periphery of the trays Struts 84 are placed between the support members 80 to provide additional strength. Each tray has openings (not shown) in its base 62 to allow passage of gas or vapour therethrough and the pillar 54 has a plurality of apertures 64 located adjacent each tray 60 to enable passage of such gas or vapour to or from the internal duct 56. Cone-shaped baffles 66 serve the dual purpose of directing gas or vapour to or from the lower side of an adjacent tray 62 via the internal duct 56 and of directing gas or vapour to or from the upper side of the other adjacent tray via the interior of the shell 52. Entry or exit of gas or vapour to or from the shell interior is via a port 68 which is formed by the structure of the central pillar 54. The interior duct 56 of the pillar is blanked off at 70 and a plurality of slotted holes 72 are provided in the top section of the pillar support structure to enable passage of gas or vapour into or from the interior of the shell. A curved section 74 is provided at the base of the vessel between the outer shell and the lowermost tray and this acts both as a gutter for collecting initial liquid condensate on the inside surface of the shell 52 and as a bellows for taking up differential expansion and contraction of the shell 50 and the lowermost tray to which it is connected to close off the shell interior. A suitable drain (not shown) communicates with the gutter 74 so that such liquid condensate may be run off to a decanter.

In operation, solvent laden air passes into the interior of the shell 52 via the port 68 and the slotted openings 72 and is distributed around each of the trays 60 which in use are substantially filled with adsorbent such as activated carbon. Solvent vapour is adsorbed as the air passes through the adsorbent beds and the air then passes into the interior duct 56 via the openings in the trays and the respective apertures 64 in the central pillar to be conveyed to exhaust via the conduit 58. When the adsorbent beds become saturated the adsorption phase is stopped and the desorption phase is commenced to strip the adsorbed solvent from the adsorbent beds by means of a purge gas, e.g. steam, for subsequent recovery.

Figure 7:
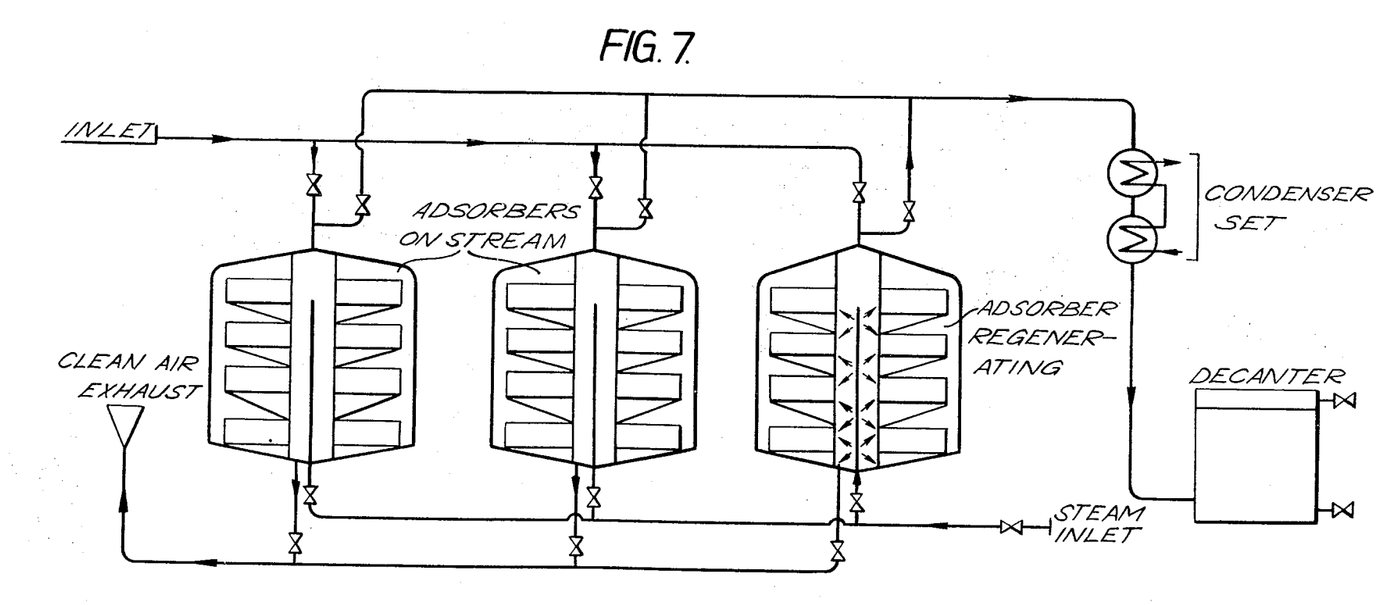
FIG. 7 is a schematic flow diagram of a solvent recovery system incorporating three adsorber vessels constructed according to FIGS. 5 and 6.

FIG. 7 shows a flow diagram of a solvent recovery system incorporating three adsorbers of the kind described above. The operation of each of the adsorbers is cyclically staggered to enable substantially continuous recovery of solvent vapours. As shown, two of the adsorbers are in an adsorption phase and one adsorber is in a desorption phase. Operation is controlled by the various valves shown. When an adsorber is on stream, solvent laden air passes into the adsorber for extraction of the solvent vapours and the clean air then passes to exhaust. For stripping of solvent from a saturated adsorber, steam is conveyed into the interior duct of the central pillar from which it passes through the adsorbent beds to strip solvent therefrom and the steam is then conveyed to a condenser set. In hydrocarbon recovery the solvent separates out in the condenser and the condensate is conveyed to a decanter as shown for recovery of the solvent. As the supply pressure of the steam is quite high, it is preferred to introduce the steam into the interior ducts of the adsorbers by means of a sparge pipe which extends up the central pillar of each adsorber as shown in FIG. 7 and also in broken line in FIG. 6.

For recovery of solvents which are miscible with water the steam and vapour mixture would be conveyed to distillation or fractionation plant.

Although separate adsorbers are shown in FIG. 7, it is conceived that an adsorber according to the invention may comprise separate isolated compartments one on top of the other to form an adsorption tower with groups of trays for adsorbent supported by a central column extending up the tower. In use the different compartments could be staggered cyclically so that while one compartment is on stream another is being steam regenerated for recovery of solvent. The outer shell of the tower would be virtually hung in the manner of a curtain wall and can be made from light gauge material as the shell would not be supporting any weight and the pressure inside would not be great.

For recovery of agressive solvents the outer shell of adsorbers according to the invention may be fabricated of expensive alloys such as silicon bronze, stainless steel and other nickel alloys at much reduced cost due to the fact that the shell may be made from light gauge material while maintaining the central supporting pillar and trays in less expensive heavier materials such as ordinary good carbon steels which may advantageously be coated with a corrosion-resistant material. It is noted that corrosion of the trays and tray support structure is less likely to occur than corrosion of the shell. This is because during the initial stage of steam stripping of solvent from the adsorbent the trays and support structure heat up quickly and are kept dry by the steam while on the other hand the shell takes longer to heat up with the result that it may collect acidic condensate on its inside surface. Thus, the fact that the outer shell can be of relatively thin material means that the shell is able to heat up more quickly than in the prior art adsorbers described above and so by the present invention this initial condensate is kept to a minimum.

It will be appreciated that the invention is not intended to be limited in scope to the preferred embodiments described above but rather by the appended claims. In particular apparatus according to the present invention may be employed for any process requiring the contact of a gas or vapour with a solid. Such processes may involve physical or chemical absorbtion or adsorption or indeed a gas-solid chemical reaction, the nature of the solid material to be employed in the trays being determined by the nature of the process for which the apparatus is desired.

I claim:

1. Apparatus for use in contacting a gas or vapour with particulate solid material, comprising a shell, a pillar within the shell, said pillar comprising a hollow interior, forming an interior duct having a plurality of groups of apertures at intervals therealong, a plurality of trays for the solid particulate material supported by said pillar adjacent said groups of apertures respectively, and openings in each of said trays communicating with said respective apertures in said pillar for allowing passage of gas or vapour through the trays between the interior of the shell and the interior duct of said pillar, said shell having first and second ports communicating respectively with the interior of the shell and said interior duct such that passage of gas or vapour through the apparatus is permitted only via said openings and apertures.

2. Apparatus according to claim 1 wherein said trays are supported solely by the pillar.

3. Apparatus according to claim 1, wherein additional support for said trays is provided by a plurality of upwardly extending support members spaced around the periphery of said trays and attached thereto.

4. Apparatus according to claim 1, wherein the trays are supported from said pillar by means providing baffles arranged to direct the flow of gas or vapour to and from said trays.

5. Apparatus according to claim 4, wherein each of said baffles has one side which is effective to direct gas or vapour to or from one side of an adjacent tray and another side which is effective to direct gas or vapour to or from the other side of the other adjacent tray.

6. Apparatus according to claim 1, including means extending within the interior duct of said pillar to enable the introduction of purge gas for regeneration of the particulate material in situ in said trays.

7. Apparatus according to claim 6, wherein said means for the introduction of purge gas comprises a sparge pipe.

8. Apparatus according to claim 1, wherein said pillar also provides support for the shell.

9. Apparatus according to claim 1 wherein stiffening members are provided for said shell.

10. Apparatus according to claim 1, wherein a curved section connects the base of said shell with the lowermost tray structure to provide a gutter for the collection of liquid condensate from the interior surface of said shell and for allowing differential expansion and contraction between said shell and said tray structure.

11. In the method of contacting a gas or vapour with a particulate solid material wherein the gas or vapour is passed through a vessel containing said particulate solid material, the improvement wherein said particulate material is contained in a plurality of trays which are supported within said vessel by means of a pillar comprising an interior duct, said pillar and trays having apertures and openings therein respectively which allow passage of the gas or vapour through said particulate solid material between the interior of the vessel and the interior duct of said pillar, and said vessel having ports communicating respectively with the interior of the vessel and said interior duct, passing said gas or vapour through the vessel only via said apertures and openings.

12. In the method of drying or dehumidifying air, wherein the air is passed through an adsorber vessel containing a dessicant, the improvement wherein said dessicant is contained in a plurality of trays which are supported within said vessel by means of a pillar comprising an interior duct, said pillar and trays having apertures and openings therein respectively which allow passage of air through said dessicant between the interior of the vessel and the interior duct of said pillar, and said vessel having ports communicating respectively with the interior of the vessel and said interior duct, passing said air through the vessel only via said apertures and openings.

13. In the method of recovering solvent from a vapour or gas stream, wherein said stream is passed through an adsorber vessel containing a particulate adsorbent material, the improvement wherein said adsorbent material is contained in a plurality of trays which are supported within said vessel by means of a pillar comprising an interior duct, said pillar and trays having apertures and openings therein respectively which allow passage of said stream through said adsorbent material between the interior of the vessel and the interior duct of said pillar, and said vessel having ports communicating respectively with the interior of the vessel and said interior duct, passing said stream through the vessel only via said apertures and openings.

14. The method according to claim 13, wherein the trays are supported from said pillar by means providing baffles arranged directing the flow of gas or vapour to and from said trays.

15. The method according to claim 12, wherein each of said baffles has one side which directs gas or vapour to or from one side of an adjacent tray and another side which deflects gas or vapour to or from the other side of the other adjacent tray.

16. The method according to claim 13, wherein said adsorber vessel includes a sparge pipe extending along said interior duct through which a purge gas is introduced under pressure which regenerates adsorbent material in situ.

* * * * *